Patented Oct. 10, 1933

1,930,409

UNITED STATES PATENT OFFICE 1,930,409

PROCESS OF PREPARING ANHYDROUS LEUCO VAT DYESTUFFS

Ronald Sidney Barnes, John Edmund Guy Harris, Birkett Wylam, and John Thomas, Grangemouth, Scotland, assignors to Scottish Dyes, Limited, of Grangemouth, Scotland No Drawing. Application January 16, 1929, Serial No. 333,017, and in Great Britain January 17, 1928

12 Claims. (Cl. 260—42)

This invention relates to the preparation of suspensions or solutions of anhydrous reduction products of vat dyestuffs.

The drying of the so-called "leuco compounds" of vat dyestuffs (by which is meant the hydroxyl derivatives obtained by reduction) is a very difficult matter, owing to the tendency of the "leuco compound" to oxidize during drying and with the more susceptible, for example many of those of the anthraquinone series, extraordinary precautions are necessary. In most cases the sodium salts of the leuco compounds are even more susceptible to oxidation than the leuco compounds themselves.

We have now found that these reduction products of vat dyestuffs, that is to say the "leuco compounds" and their alkaline salts, are much more readily handled when in the wet condition, whether "wetted" actually with water or an organic liquid, which may or may not be a solvent.

Based on this discovery we have devised a method of preparing these reduction products substantially free from water.

This invention consists in the preparation of suspensions or solutions of anhydrous reduction products of vat dyestuffs—specific reference being made to anthraquinone vat dyestuffs, indigoid vat dyestuffs, dimethoxydibenzanthrone (see United States Patent No. 1,531,262) and indigo—by adding an aqueous preparation of a "leuco" compound or an alkaline salt thereof to an organic liquid chosen from among those from which water may be removed by distillation, for example chlor-benzene, dimethyl aniline and nitro-benzene, and distilling the mixture under suitable pressure until the water is substantially removed.

The invention also consists in a process according to the preceding paragraph in which the suspension or solution of the anhydrous reduction product is converted to a stable soluble ester derivative such as for example a sulphuric acid ester or a phosphoric acid ester for instance by treatment with pyridine sulphuric anhydride.

The invention also consists in methods substantially as herein described for the preparation of suspensions or solutions of anhydrous reduction products of vat dyestuffs and for the preparation of stable soluble ester derivatives from those suspensions or solutions.

The invention also consists in products which may be prepared by the methods herein described or by the chemical equivalents of those methods.

In preparing anhydrous suspensions of the leuco compounds these may be precipitated from ordinary vats by means of acid in the usual way, filtered off and washed and then added to the organic liquid in the form of an aqueous paste. Where it is required to obtain anhydrous suspensions or solutions of the alkali salts of leuco compounds, which as a rule are more soluble, these may be prepared by suspending the washed leuco compounds in a small quantity of water, adding the organic solvent, which should preferably be non-miscible with water, and then adding the appropriate alkaline hydroxide so that the alkali salt of the leuco compound is formed.

Addition of excess of the alkaline hydroxide or of an appropriate salt will usually cause the reduction product of the vat dyestuff to be salted out from the aqueous layer into the organic liquid. The aqueous layer may then be removed and the organic liquid suspension or solution distilled under suitable pressure, and the water substantially removed.

When dealing with some of the reduction products, particularly those of the anthraquinone series, it is preferable to exclude air as far as possible and to work in an atmosphere of an inert gas such as nitrogen.

One use of the anhydrous preparations of reduction products of vat dyestuffs thus obtained is in the preparation of stable, soluble derivatives (such as, for example, sulphuric acid esters or phosphoric acid esters) by treating these reduction products of vat dyestuffs with suitable esterifying agents in the presence of a tertiary base. In some cases the tertiary base may be used as the organic liquid, if, for example, it belongs to the type from which water is readily separated by distillation.

If it is desired to use a tertiary base such as pyridine from which water is not readily separated by distillation, then an inert solvent such as chlorobenzene may be employed in preparing the suspension or solution of the reduction product and the necessary pyridine may be added after the water has been removed and prior to esterification.

The following examples illustrate how the invention may be carried into effect, all parts being parts by weight:—

Example 1

20 parts of thio indigo powder are suspended in 1,000 parts of water containing 20 parts of caustic soda. The mixture is heated to 60°, 15 parts of sodium hydrosulphite added and the color allowed to vat for ½ an hour. The mixture is then filtered and the filtrate again heated to 60°, when it is acidified with dilute hydrochloric acid and the precipitated white leuco compound of thio indigo filtered off, washed with warm air-free water and sucked as dry as possible on a vacuum filter.

The resulting paste is mixed with 150 parts of water and 150 parts of dimethyl aniline added, the operation being carried out in an atmosphere of coal gas. An intimate mixture or emulsion is formed on shaking and to this are added 30 parts of caustic soda dissolved in 100 parts of water.

On standing for some time the mixture separates into two layers, the upper dimethyl aniline layer containing most of the reduced dyestuff derivative. The dimethyl aniline layer is separated and distilled in vacuo at 90°. The distillate consists of water and dimethyl aniline and distillation is continued until an examination of the distillate shows that the water has been substantially removed.

The suspension of the reduced product of thio indigo (apparently the sodium salt) may be converted to a stable soluble derivative, for example a sulphuric acid ester, by treatment with 30 parts of pyridine sulphuric anhydride at 80° for one hour. The melt is then diluted, made alkaline and the dimethyl aniline removed by steam distillation. On filtration a solution of the sodium salt of the sulphuric acid ester of thio indigo is obtained.

*Example 2*

5 parts of flavanthrone are vatted with 250 parts of water, 7.5 parts of soda and 7.5 parts of hydrosulphite at 60°.

The vat is then filtered and the solution acidified with acetic acid. The precipitated "leuco" compound is filtered off, well washed with water and sucked as dry as possible. The washed paste is then added to 100 parts of dimethyl aniline and distilled in vacuo, the temperature being finally raised to 90°. During the distillation a slow stream of nitrogen is allowed to pass through the apparatus.

About 50 parts of dimethyl aniline is distilled off together with the water that had been present, leaving a substantially dry suspension of "leuco" flavanthrone in dimethyl aniline.

The "leuco" flavanthrone thus obtained can be readily converted to a sulphuric acid ester or other derivative in known manner.

*Example 3*

15 parts of indigo are vatted with 1000 parts of water, 22.5 parts of caustic soda and 22.5 parts of hydrosulphite at 60°. The filtrate is acidified with acetic acid and the precipitated "leuco" compound filtered off and well washed with water. The wet paste is then added to 200 parts of chlor benzene and the suspension then distilled until tests of the distillate show that all the water has been removed.

*Example 4*

10 parts of dimethoxy dibenzanthrone (see United States Patent No. 1,531,262) are reduced with 19 parts of sodium hydrosulphite and 650 parts of water containing 10 parts of caustic soda at 50° C.

When the reduction is complete the temperature is finally raised to 90° C. and the mixture is then acidified with glacial acetic acid. The "leuco" compound thus precipitated is filtered off, washed with warm air-free water and sucked as dry as possible. The paste is mixed with 100 parts of dimethyl aniline and distilled in a slow current of nitrogen at ordinary pressure, the temperature being raised to the boiling point of dimethyl aniline, by which temperature substantially all the water has passed over, leaving a substantially anhydrous suspension of the "leuco" compound of dimethoxydibenzanthrone (see United States Patent No. 1,531,262). This suspension may be used for the preparation of sulphuric acid esters in known manner.

*General*

"Leuco" compounds prepared as described above may be esterified to give the sulphuric acid ester or other derivative by adding a tertiary base, for example pyridine and treating with an esterifying agent in known manner.

Having now described our invention, what we claim as new and desire to secure by Letters Patent is:—

1. A process for the preparation in liquid medium of anhydrous leuco compound of the group consisting of anthraquinone vat dyestuffs and indigoid vat dyestuffs, said process consisting in adding an aqueous preparation of the leuco compound to an organic liquid selected from the group consisting of chlor-benzene, dimethyl aniline and nitrobenzene, and then distilling the mixture under suitable pressure until the water is substantially removed.

2. A process as claimed in claim 1 according to which the anhydrous leuco compound is converted to a soluble sulphuric acid ester by treatment with pyridine sulphuric anhydride.

3. A process as claimed in claim 1 in which the leuco compound is in the form of an alkaline salt.

4. A process for the preparation in liquid medium of anhydrous leuco vat dyestuffs which consists in mixing an aqueous preparation of a leuco compound of the group consisting of flavanthrone, thioindigo, indigo and dimethoxy dibenzanthrone, with an aqueous preparation of a leuco compound and adding an organic liquid, selected from the group consisting of chlor-benzene, dimethyl aniline and nitrobenzene, and then distilling the mixture under suitable pressure until the water is substantially removed.

5. A process as claimed in claim 4 according to which the anhydrous leuco compound is converted to a soluble sulphuric acid ester by treatment with pyridine sulphuric anhydride.

6. A process as claimed in claim 4 in which the leuco compound is in the form of an alkaline salt.

7. A process for the preparation in liquid medium of anhydrous leuco vat dyestuffs which consists in mixing an aqueous preparation of a leuco compound of the group consisting of anthraquinone vat dyestuffs and indigoid vat dyestuffs and adding an organic liquid from which water may be removed by distillation, and then distilling the mixture until the water is substantially removed.

8. A process as claimed in claim 7 according to which the anhydrous leuco compound is converted to a soluble sulphuric acid ester by treatment with pyridine sulphuric anhydride.

9. A process as claimed in claim 7 in which the leuco compound is in the form of an alkaline salt.

10. A process for the preparation of suspensions of anhydrous leuco compounds, said process consisting in suspending 20 parts of thioindigo in 1000 parts of water containing 20 parts of caustic soda, and heating to about 60° C., then adding 15 parts of sodium hydrosulphite and permitting to vat until leuco formation is complete;

filtering the mixture and reheating the filtrate to about 60° C. and acidifying with dilute hydrochloric acid; the precipitated leuco compound of thioindigo being thereupon filtered off, washed and dried on a vacuum filter thus obtaining a paste: said paste being then mixed under agitation with 150 parts of water and 150 parts of dimethyl aniline in a coal gas atmosphere adding a solution of 30 parts of caustic soda in 100 parts of water; lastly permitting said mixture to stand and settle thereupon separating and distilling the dimethyl aniline layer in vacuo at 90° C., all parts being by weight.

11. A process for the preparation in liquid medium of anhydrous leuco vat dyestuffs, which consists in mixing an aqueous preparation of the leuco compound of the group consisting of anthraquinone vat dyestuffs and indigoid vat dyestuffs, and an organic liquid, which is substantially inert to the starting materials and reagents and from which water may be removed by distillation, and then distilling the mixture until the water is substantially removed.

12. A process for the preparation in liquid medium of anhydrous leuco vat dyestuffs, which consists in adding an aqueous preparation of the leuco compound selected from the group consisting of flavanthrone, thioindigo, indigo and dimethoxy dibenzanthrone to an organic liquid selected from the group consisting of chlor-benzene, dimethyl aniline and nitrobenzene, and then distilling the mixture under suitable pressure until the water is substantially removed.

RONALD SIDNEY BARNES.
JOHN EDMUND GUY HARRIS.
BIRKETT WYLAM.
JOHN THOMAS.